Aug. 5, 1969     J. W. SIVERTSEN     3,459,017
KEY RETAINER
Filed Feb. 23, 1968
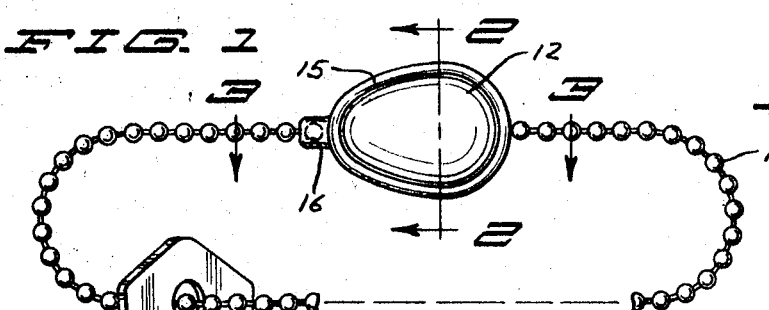
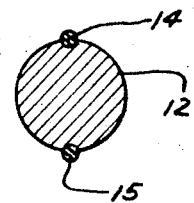
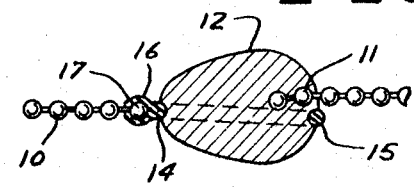
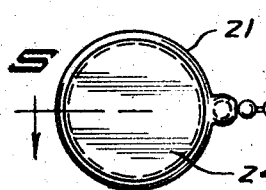
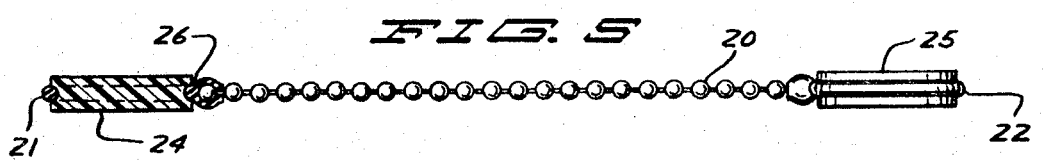
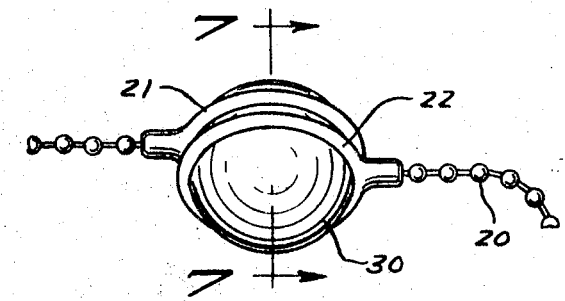
INVENTOR.
JOHN W. SIVERTSEN
BY *Carlsen, Carlsen, Stern & Wicks*
ATTORNEYS United States Patent Office 3,459,017
Patented Aug. 5, 1969

3,459,017
KEY RETAINER
John W. Sivertsen, 5321 35th Ave. S.,
Minneapolis, Minn. 55417
Filed Feb. 23, 1968, Ser. No. 707,528
Int. Cl. A44b 15/00
U.S. Cl. 70—457
4 Claims

ABSTRACT OF THE DISCLOSURE

A flexible chain or the like to be strung through the eyes of keys or similar items to hold them in collection, there being a ring of elastic material connected to at least one end of the chain and which is deformable to permit passage thereof through said eyes to add keys to or remove them from the chain and a block of rigid material having groove means for receiving the ring in distended condition to prevent deformation thereof.

---

Inexpensive key retainers or chains such as the bead chain and clasp type commonly used for holding automobile keys are generally provided with a small bead and socket clasp which is difficult to connect and disconnect due to the minute size of the parts involved.

It is an object of this invention to provide an improved clasp or retension member for a key chain which can be easily and quickly operated to permit addition or removal of keys with respect to the chain.

Another object of the invention is to provide a new and improved key retainer with a clasp means which is compact, smooth, and inexpensive to manufacture.

The invention broadly comprises a key chain having a resilient O-ring attached to one end which can be collapsed under slight manual pressure to allow keys to be slipped onto or off of the chain and a ring distender member either connected to the other end of the chain or independent thereof and having a peripheral groove for seating the ring in distended condition to prevent the collapsing thereof.

The above mentioned objects of the invention will be brought to light during the course of the following specification, reference being made to the accompanying drawing, in which FIG. 1 is a plan view of a key chain or retainer embodying one form of the present invention.

FIG. 2 is a section through the chain clasp taken on line 2—2 of FIG. 1.

FIG. 3 is a section through the clasp taken on line 3—3 of FIG. 1.

FIG. 4 is a plan view of a modified form of the invention.

FIG. 5 is a longitudinal section taken on line 5—5 of FIG. 4.

FIG. 6 is a perspective view showing the clasp of another embodiment of the invention.

FIG. 7 is a section taken on line 7—7 of FIG. 6.

Referring now more particularly to the drawing reference characters will be used to denote like parts or structural features in the different views. The retainer in FIGS. 1 to 3 has a section of flexible bead chain 10 with one end portion 11 thereof embedded in a teardrop shaped distender or terminal block 12. Member 12 has a continuous groove 14 extending medially around the longer dimension thereof and substantially parallel to and to one side of the chain 10 as it extends outwardly therefrom. An O-ring 15 of elastic material is provided with an integral connector lug 16 which is molded on the other end 17 of chain 10. Ring 15 has circumference which is slightly smaller than that of the groove 14 whereby when the ring is stretched over the distender it will seat firmly in the groove. To string keys such as K on or remove them from the chain 10, the ring 15 is rolled out of groove 14 and off of the member 12. It can then be collapsed sufficiently to be passed through the eye of key K. To reconnect the chain ends the ring 15 is then again stretched over member 12 and reseated in groove 15.

In the form of the invention shown in FIGS. 4 and 5 the section of bead chain 20 has O-rings 21 and 22 similar to ring 15 mounted on each end. A pair of disks 24 and 25 are respectively provided with peripheral grooves 26 and 27. These grooves have circumferences greater than the internal circumference of the rings 21 and 22 so that the rings must be stretched therearound and will seat firmly in the grooves. In this form of the invention keys may be strung on or removed from either end of the chain 20, it being understood that when either ring is removed from its distending disk it may be collapsed so as to pass through the eye of a key. While not shown, the disks 24 and 25 may be formed with a suitable socket on one or both faces for holding a coin for parking meter use.

A third form of the invention is shown in FIGS. 6 and 7. Here the chain and ring assembly shown in FIGS. 4 and 5 is used with rings 21 and 22 connected to the ends of the bead chain 20. However, in place of the disks a spherical distender 30 is used having side by side grooves 31 and 32 therein for seating both rings 21 and 22, as shown, to provide a closed loop retainer or chain. Here again the grooves have a greater internal circumference than the O-rings to hold them in distended condition. Either O-ring may be rolled out of its groove for adding keys to or removing them from the chain.

The grooved distender and O-ring construction accordingly provides a simple, economical, and easy to operate clasp means for a key retainer chain.

Having now therefore fully illustrated and described my invention, what I claim to be new and desire to protect by Letters Patent is:

1. In a key retainer:
   (a) a section of chain for stringing through the eye on a key handle,
   (b) a ring connected to one end of the chain,
   (c) said ring being of an elastic material so as to be collapsible to allow passage thereof through the eye, and
   (d) a distender member of rigid material having peripheral groove means therein for seating and holding the ring in distended condition to prohibit the collapsing thereof and thus prevent removal of a key from said one end of the chain.

2. The subject matter of claim 1 wherein said distender member is connected to the other end of the chain.

3. The subject matter of claim 1 wherein one of such rings is connected to each end of the chain, and their being one such distender member for each ring.

4. The subject matter of claim 1 wherein one of such rings is connected to each end of the chain, and said distender member having two of said peripheral groove means one for seating each of said rings.

References Cited

UNITED STATES PATENTS

| | | | |
|---|---|---|---|
| 1,974,499 | 9/1934 | Luce | 70—458 |
| 2,326,693 | 8/1943 | Sindler | 70—457 |
| 2,985,006 | 5/1961 | Du Bois | 70—458 |

MARVIN A. CHAMPION, Primary Examiner

R. L. WOLFE, Assistant Examiner